United States Patent [19]

Vinod et al.

[11] Patent Number: 5,747,133
[45] Date of Patent: May 5, 1998

[54] DECORATIVE COMPOSITE FLOOR COVERINGS

[75] Inventors: Yashavant Vinayak Vinod, Hockessin; Wayne Curtis Whelchel, Newark, both of Del.

[73] Assignee: E. I. du Pont de Nemours and Company, Wilmington, Del.

[21] Appl. No.: 770,192

[22] Filed: Dec. 19, 1996

[51] Int. Cl.$^6$ ............................ B32B 5/06; B32B 5/08
[52] U.S. Cl. ........................ 428/46; 428/19; 428/30; 428/43; 428/70; 428/76; 447/63; 447/69; 447/155; 52/389; 52/390
[58] Field of Search ................. 428/159, 19, 30, 428/43, 70, 76, 46; 52/390, 389; 442/63, 69, 155

[56] References Cited

U.S. PATENT DOCUMENTS

| | | | |
|---|---|---|---|
| 2,629,678 | 2/1953 | Thompson et al. | 154/46 |
| 2,688,578 | 9/1954 | Teague | 154/49 |
| 3,002,868 | 10/1961 | Boivin | 154/49 |
| 3,360,422 | 12/1967 | Desch | 161/89 |
| 3,458,337 | 7/1969 | Rugg | 117/15 |
| 3,620,890 | 11/1971 | Kemmler | 161/6 |
| 3,871,948 | 3/1975 | Norris | 161/154 |
| 4,018,957 | 4/1977 | Werner et al. | 428/141 |
| 4,138,521 | 2/1979 | Brown | 428/159 |
| 4,522,857 | 6/1985 | Higgins | 428/95 |
| 4,844,765 | 7/1989 | Reith | 156/306.6 |
| 4,939,036 | 7/1990 | Reith | 428/349 |

FOREIGN PATENT DOCUMENTS

| | | | |
|---|---|---|---|
| 762634 | 4/1971 | Belgium. | |
| 2017915 | 5/1970 | France | B28D 7/00 |
| 2160631 | 6/1973 | France | D06N 3/00 |
| 5-8360 | 1/1993 | Japan | B32B 31/00 |
| 5-92538 | 4/1993 | Japan | B32B 33/00 |
| 5-263372 | 10/1993 | Japan | D06N 3/06 |
| 1080046 | 8/1967 | United Kingdom | B32B 5/20 |
| 1128801 | 10/1968 | United Kingdom | B32B 5/24 |
| 1194027 | 6/1970 | United Kingdom | B32B 5/02 |
| 2284612 | 6/1995 | United Kingdom | C08J 3/20 |

*Primary Examiner*—Richard Weisberger

[57] ABSTRACT

A composite floor covering having an upper decorative layer, a stabilizing layer, and an optional cushioning layer is characterized in that the decorative layer itself comprises a fabric base and a plastic matrix having a transparent portion. The plastic matrix may include an opaque portion. At least the transparent portion of the plastic matrix has discrete fibrous structures embedded therein. The plastic matrix material is selected with melting and rheological characteristics such that the plastic matrix is prepared and applied to the fabric base in fluid form and solidifies under conditions at which the fabric base and embedded fibrous structures remain substantially intact. The fabric layer may be totally embedded within the plastic matrix or may form the lower surface of the plastic matrix. The decorative layer may include (i) fabric fragments, (ii) groupings of multi-oriented individual fibers, or (iii) mixtures of fragments and individual fibers. The fabric base may, if desired, have a decorative facing.

20 Claims, 2 Drawing Sheets

DECORATIVE COMPOSITE FLOOR COVERINGS

FIELD OF THE INVENTION

This invention relates to a composite floor covering, and in particular, to a composite floor covering having a decorative layer comprising a fabric base and a plastic matrix, the plastic matrix having discrete fibrous structures embedded therein.

BACKGROUND OF THE INVENTION

Decorative floor coverings such as carpets and vinyl flooring are well known. Carpets offer greater comfort than vinyl flooring due to their soft, cushioning feel and better warmth. Notwithstanding the wide variety of available design choice, vinyl flooring is seen by some to lack the aesthetic appearance usually associated with carpet.

It is believed that there exists a need for a composite floor covering which includes the advantages of vinyl flooring but which also offers what is believed to be more aesthetically pleasing decorative designs. The present invention is believed to provide such a composite floor covering.

SUMMARY OF THE INVENTION

The present invention is directed to a composite floor covering comprising a decorative layer, a stabilizing layer, and an optional cushioning layer.

The decorative layer itself comprises a continuous fabric base and a transparent plastic matrix having discrete fibrous structures embedded therein. The plastic matrix material is selected with predetermined melting and rheological characteristics such that the plastic matrix is prepared and applied to the fabric base in fluid form and solidifies under conditions at which the fabric base and embedded fibrous structures remain substantially intact. If desired, the plastic matrix may include an opaque portion that is disposed beneath the transparent portion. In such an instance the discrete fibrous structures are embedded in at least the transparent portion of the plastic matrix.

In one embodiment the fabric layer is embedded within the plastic matrix. In an alternate embodiment the fabric layer is layered beneath and adhered to the plastic matrix. The fabric base is selected from the group consisting of velours, felts, woven, non-woven, knitted, flocked, needle-punched, tufted and fusion-bonded fabrics.

The fabric base may have a decorative design on the upper surface (facing) thereof. The design (if present) is visible through the transparent portion of the plastic matrix and adds to the aesthetic effect of the decorative layer imparted by the presence of the fibrous structures. The opaque portion of the plastic matrix (if present) is disposed beneath the fabric base.

The fibrous structures disposed within the plastic matrix of the decorative layer may comprise (i) fabric fragments, (ii) groupings of multi-oriented individual fibers, or (iii) mixtures of fragments and individual fibers.

If individual fibers are used (whether alone or with the fragments) the length of the individual fibers is greater than about nine (9) millimeters. The individual fibers may be crimped and crinkled. The individual fibers are selected from the group consisting of polyester, polypropylene, cotton, silk, wool, acrylic and nylon. Alternatively, the fibrous structures comprises fabric fragments. Preferably, the fabric fragments have no dimension greater than about one-and-one-half (1.5) inch. The fabric fragments are selected from the group consisting of velours, felts, woven, non-woven, knitted, flocked, needle-punched, tufted and fusion-bonded fabrics.

The loading of the fibrous structures (whether implemented as individual fibers or as fabric fragments) within the plastic matrix is dependent upon the presence of the decorative design on the surface of the fabric base. Without a decorative design on the fabric base the fibrous structures may occupy up to about eighty-five percent (85%) of the surface area of the decorative layer. However, if the fabric base does carry a decorative design the fibrous structures may occupy from about five percent (5%) to about fifty percent (50%) of the of the surface area of the decorative layer.

At least one stabilizing layer is disposed beneath the decorative layer. In instances in which the fabric base is embedded within the plastic matrix the stabilizing layer is implemented as a separate layer attached beneath the decorative layer. A separate adhesive layer, or the adhesive properties of the plastic matrix itself, may be used to secure the stabilizing layer to the plastic matrix. Alternatively, in the instance wherein the fabric base is adhered beneath the plastic matrix, the fabric base may be used to function as a stabilizing layer. In this event the fabric base is selected from a material that has sufficient strength, elongation, dimensional stability and puncture resistance so as to function as a stabilizing layer. Of course, even in the instance where the fabric base is adhered beneath the plastic matrix, a separate stabilizing layer may also be provided. As will be developed herein, any of a variety of materials may be used to form the stabilizing layer.

The composite floor covering may further include an optional cushioning layer disposed beneath the stabilizing layer. The cushioning layer comprises fiber felt or a foamed composition selected from the group consisting of rubber, latex, urethane and poly(vinyl chloride).

If desired, a transparent flexible wear layer may be disposed over the plastic matrix of the decorative layer. Preferably, the transparent wear layer may be fabricated from the group consisting of urethanes, poly(vinyl chloride), silicone or fluoropolymer.

BRIEF DESCRIPTION OF THE FIGURES

The invention will be more fully understood from the following detailed description, taken in connection with the accompanying drawings, in which.

DETAILED DESCRIPTION OF THE INVENTION

Figure 1:
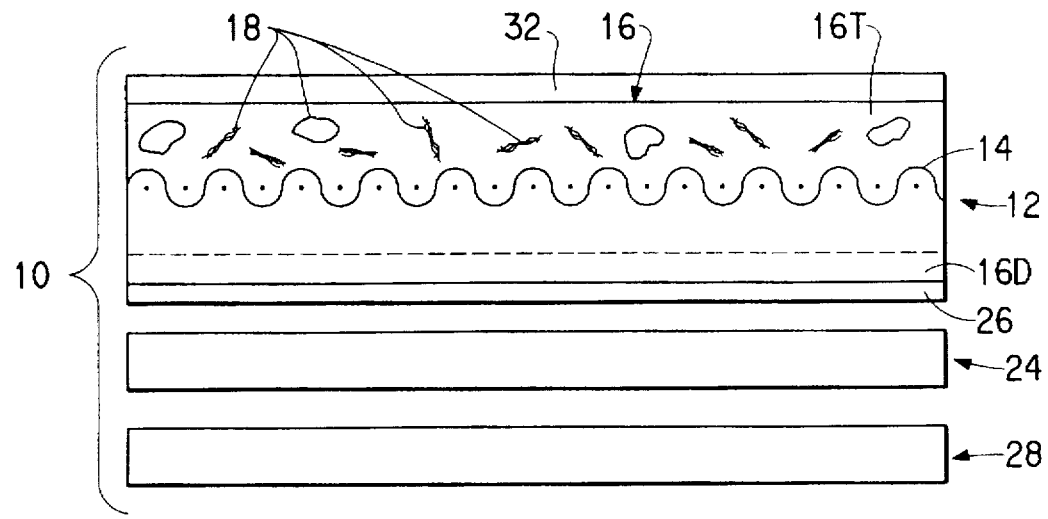
FIG. 1 is a side-elevational view of a composite floor covering of this invention illustrating the various layers thereof, and in which the base fabric is embedded within the plastic matrix of the decorative layer.

Throughout the following detailed description, similar reference numerals refer to similar elements in all figures of the drawings.

Figure 2:
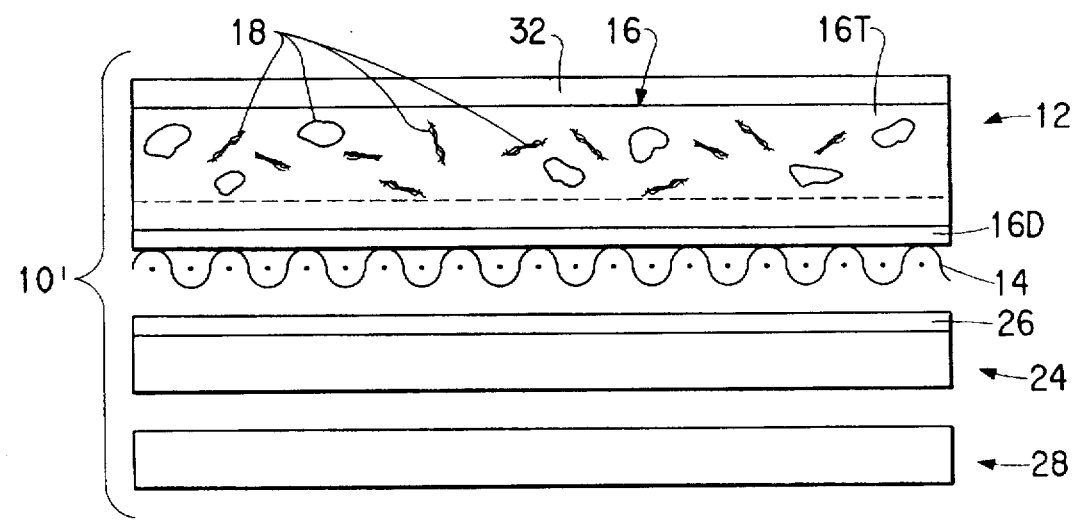
FIG. 2 is a side-elevational view similar to FIG. 1 of an alternate embodiment of the present invention in which the fabric base is adhered beneath the plastic matrix of the decorative layer.

Referring to FIGS. 1 and 2 shown in side sectional views are alternate embodiments of a composite floor covering 10 (FIG. 1) and 10' (FIG. 2) in accordance with the present invention. Generally speaking, each embodiment of the composite floor covering 10, 10' includes a decorative layer 12, at least one stabilizing layer 24 (of various forms, as will be described), and an optional cushioning layer 28.

DECORATIVE LAYER

The decorative layer 12 itself comprises a fabric base 14 and a plastic matrix 16. The upper portion 16T of the plastic matrix 16 is transparent. The plastic matrix 16 may include an optional opaque portion 16D disposed beneath the transparent upper portion 16T. At least the transparent portion 16T of the plastic matrix 16 has discrete fibrous structures generally indicated by the reference character 18 embedded therein. The decorative effect imparted by the fibrous structures 18, whether taken alone or in combination with the fabric base 14, will be discussed in connection with FIGS. 3A through 3D.

Fabric Base

The fabric base 14 is selected from the group consisting of velours, felts, woven, non-woven, knitted, flocked, needle-punched, tufted, and fusion-bonded fabrics, each of which is well known in the art. By the term "fabric" as used herein it is meant a planar textile structure composed of yarns, fibers, or filaments and having an upper surface (facing) and lower surface. The fabrics are composed of natural or synthetic fibers. Such fibers include, for example, wool, cotton, polyamides (such as nylon 6,6, nylon 6, and copolymers thereof), polyesters, polyolefins (such as polypropylene), acrylics, rayon, silk and blends thereof. The fabrics may be textured or non-textured.

Generally, woven fabrics refer to fabrics formed by weaving (i. e., interlacing) two sets of yarns, known as warp and fill. The three basic weaves are plain, twill, and satin. In the plain weave, yarns running in one direction (fill) go under and over alternate single yarns running in the other direction (warp). Plain weave fabrics are strong and durable. In the twill weave, yarns running in the filling direction go over one or more warp yarns and under groups of other yarns. Twill weave fabrics are strong with good shape-holding ability. In the satin weave, the face of the fabric consists almost entirely of warp or filling floats produced in the repeat of a weave. The points of yarn intersection are distributed as evenly and widely separated as possible. Satin-weave fabrics have a smooth, lustrous appearance.

Generally, non-woven fabrics refer to an assembly of textile fibers held together by interlocking in a random web or mat, by fusing of the fibers, or by bonding with an adhesive. Spun-bonded fabrics, such as those sold under the registered trademarks Tyvek® or Typar®, are composed of randomly arranged, continuous filament fibers bonded at filament cross-over points. These fabrics are lightweight and have good tensile and tear strengths. Spun-laced fabrics, such as that manufactured and sold by E. I. DuPont de Nemours and Company under the registered trademark Sontara®, are composed of fibers entangled in a predetermined repeating pattern to form a strong, non-bonded structure.

Knitted fabrics generally refer to fabrics which are constructed by interlocking a series of loops of one or more yarns. In warp knitting the yarns generally run lengthwise in the fabric. In weft knitting one continuous thread runs crosswise in the fabric making all of the loops in one course. Weft knitting includes circular knitting and flat knitting. In circular knitting the fabric is produced on the knitting machine in the form of a tube, wherein the threads run continuously around the fabric. In flat knitting the fabric is produced on the knitting machine in flat form, wherein the threads alternate back and forth across the fabric.

The upper surface (facing) of the fabric base 14 may be plain or may carry a decorative design. In the present invention colors and designs can be applied to the fabrics by conventional techniques such as by dyeing the yarns, fibers or filaments which compose the fabric or by dyeing or printing the fabric itself. For example, in solution-dyeing processes, pigments are added to the fiber-spinnable polymer melt or solution prior to extrusion of the melt or solution through a spinneret to form solution-dyed fibers. Alternatively, the fibers may be pre-dyed by such techniques as "stock-dyeing" (the dyeing of fibers in staple form). Alternatively, the yarn may be pre-dyed before it used to form a fabric. Yarn dyeing techniques include skein-dyeing, space-dyeing and package-dyeing. Dyed yarns of different colors may be used to give the fabric multicolored patterns.

A second method for imparting a decorative design to fabrics is printing. In general, printing involves applying coloring agents onto the fabric which is then treated with heat or chemicals to fix the coloring agents. Printing techniques include, for example, pigment printing, roller printing, screen printing, and heat transfer printing.

Plastic Matrix

The plastic matrix 16 is formed by a plastisol that comprises, at a minimum, a base resin, a plasticizer, and a stabilizer system.

The ingredients are selected such that at least the upper portion 16T of the finished plastic matrix 16 is sufficiently transparent (i. e., clear) that the fibrous structures may be seen therethrough.

The base resin is typically poly(vinyl chloride).

Suitable for use as the plasticizer is a polyester plasticizer sold by Huls America, Inc., as NUOPLAS 6000.

The stabilizer system may include a primary stabilizer, such as a mixture of metallo-organic salts. Suitable for use is a mixture of organic salts and barium and zinc, such as that sold by Witco Corporation as Mark 4737. The stabilizer system may also include a secondary stabilizer, such as epoxidized soybean oil.

The plastic matrix material is selected with predetermined melting and rheological characteristics such that the plastic matrix is prepared and applied to the fabric base as a liquid when at room temperature. The plastic matrix is such that during the thermal and shear history experienced during the incorporation of the embedded fibrous structures, and the application of the plastic matrix to the fabric base, the fabric base and embedded discrete fibrous structures remain substantially intact. As used in the context of this application the term "intact" means that the fibrous structures are not melted, burned, or otherwise removed during the solidification of the plastic matrix while fabricating the floor covering 10, 10'.

Any transparent polymer that can be processed below the melting point of the fibrous structures 18 can be used as the plastic matrix 16. Any transparent polymers, such as the polymers selected from the group consisting of PVC plastisol, PVC/Elvaloy® polymers, urethanes, poly(vinyl chlorides), silicones, fluoropolymers or ionomers like that sold under the registered trademark Surlyn® may be used for the transparent portion of the plastic matrix 16. A polymer that flows like a liquid at room temperature so it may be easily applied to the fabric base is preferred. Some of the polymers listed may have to be heated to become sufficiently fluid to apply to the fabric base. It should also be noted that when certain materials selected for the fabric base, care would have to be exercised to insure that the solidification temperature of the polymer selected for the plastic matrix is less than the melting temperature of the fabric base.

As noted, the plastic matrix 16 may also include an opaque portion 16D lying below the transparent portion 16T in which fibrous structures are disposed. If a fabric base having a decorative facing is used, the opaque portion 16D, if one is provided, is always positioned below the fabric base.

Polymers suitable for use as the opaque portion of the plastic matrix include plasticized PVC, PVC/Elvaloy® polymers, ethylene/vinyl acetate copolymer, flexible polyolefin compounds derived from ethylene/propoylene homopolymers and copolymers.

Fibrous Structure

The fibrous structures 18 disposed within the plastic matrix 16 of the decorative layer 12 may themselves take a variety of forms.

In one instance the fibrous structures 18 comprises fabric fragments. Preferably, the fabric fragments have no dimension greater than about one-and-one-half (1.5) inch. The fabric fragments are selected from the group consisting of velours, felts, woven, non-woven, knitted, flocked, needle-punched, tufted and fusion-bonded fabrics.

Alternatively or additionally, the fibrous structures 18 comprises groupings of multi-oriented individual fibers. The fibers are illustrated in the drawings as filamentary members, while the fragments are illustrated an irregularly shaped members generally having a length and a width dimension.

If implemented as individual fibers the length of the individual fibers is greater than about nine (9) millimeters. The individual fibers may be crimped and crinkled. The individual fibers are selected from the group consisting of polyester, polypropylene, cotton, silk, wool, acrylic and nylon. A convenient source for such individual fibers is recycled carpet or other textile materials.

The loading of the fibrous structures (whether implemented as fabric fragments, individual fibers, or a mixture thereof) within the plastic matrix 16 (i. e., in at least the transparent portion 16T thereof) is dependent upon the presence of the decorative design on the facing of the fabric base 14. If the fabric base is plain (i. e., without a decorative design on the facing of the fabric base 14) the fibrous structures may occupy up to about eighty-five percent (85%) of the surface area of the transparent portion 16T of the decorative layer. However, if the facing of the fabric base does carry a decorative design, the fibrous structures may occupy from about five percent (5%) to about fifty percent (50%) of the surface area of the transparent portion 16T of the decorative layer.

Figure 3A:
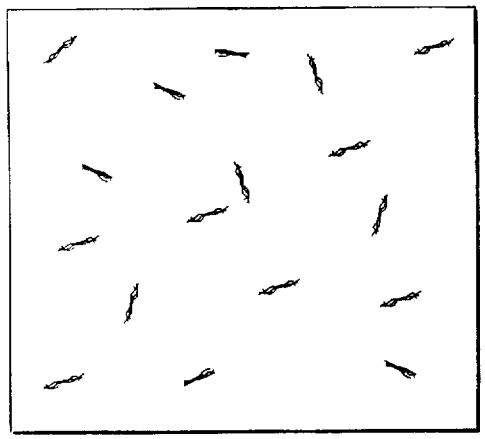
FIGS. 3A through 3D are plan views of the composite floor covering in accordance with either embodiment of the present invention in which the fibrous structures comprises individual fibers (FIG. 3A), fabric fragments (FIG. 3B), a combination of individual fibers and fabric fragments (FIG. 3C), and in which the upper surface (facing) of the fabric base has a decorative fabric (FIG. 3D).
Figure 3B:
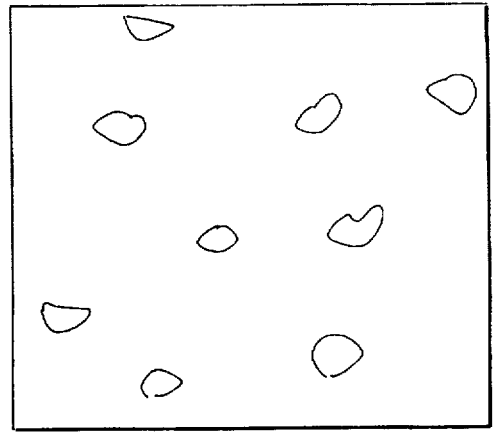
Figure 3C:
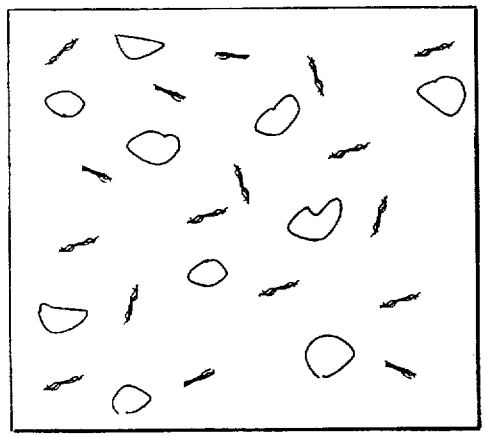
Figure 3D:
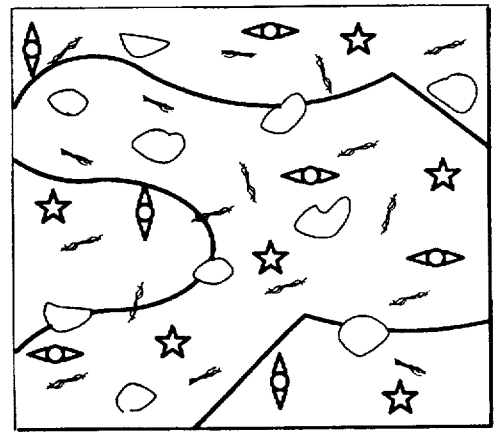

The decorative effect imparted to the decorative layer 12 by the presence of the fibrous structures 18 is best illustrated in FIGS. 3A through 3D, to which reference is invited. (The reference numerals and lead lines are omitted for clarity of illustration.) The fibrous structures 18 (whether implemented as individual fibers or as fabric fragments) are visible through the plastic matrix owing to the transparency of the transparent portion thereof. FIG. 3A illustrates the effect with the fibrous structures 18 implemented as individual fibers viewed against a plain fabric base 14. FIG. 3B illustrates the effect with the fibrous structures 18 implemented as fabric fragments viewed against a plain fabric base 14. The effect imparted by a combination of individual fibers and fabric fragments, again viewed against a plain base, is shown in FIG. 3C. From FIGS. 3A and 3C it should be noted that the fabric base 14, whether it is totally or partially embedded within the matrix 16, is visible and serves as a backdrop against which the fibrous structures 18 may be viewed. As shown in FIG. 3D, the decorative effect is still further enhanced if the fabric base 14 is itself carries a decorative design. In FIG. 3D, the situation in which the fibrous structures are implemented as a combination of individual fibers and fabric fragments is illustrated. It should be apparent that the implementation in which the fibrous structures are all fibers or all fragments (as in FIGS. 3A and 3B, respectively) may be used in the situation of FIG. 3D (in which the fabric base carries a decorative design on the facing thereof), if desired.

In all cases the fibrous structures 18 are incorporated into the plastic matrix 16 in a manner such that they remain substantially intact. As used in the context of this application the term "intact" means that the fibrous structures are not melted, burned, or otherwise removed during the solidification of the plastic matrix.

STABILIZING LAYER

At least one stabilizing layer 24 is disposed beneath the decorative layer 12. The stabilizing layer provides dimensional stability for the composite floor covering 10, 10'.

The stabilizing layer 24 has an upper and lower surface. The upper surface is attached to the lower surface of the decorative layer 12, while the lower surface is in contact and preferably attached to the cushioning layer 28, as described further below. It is important that the floor covering 10, 10' have at least one stabilizing layer, and in some instances where additional stability is required, there should be multiple stabilizing layers. The stabilizing layer also promotes better adhesion between the decorative layer 12 and the cushioning layer 28. The stabilizing layer 24 also provides resistance against punctures to the decorative layer and cushioning layer and tends to reduce the degree of indentation marks when furniture legs and the like are placed on the floor covering. Finally, the stabilizing layer can also provide resistance against wear when the floor covering is subjected to heavy foot traffic.

As seen from FIG. 1, in instances in which the fabric base 14 is embedded within the plastic matrix 16, the stabilizing layer 24 is implemented as a separate layer attached beneath the decorative layer 12. The stabilizing layer 24 may be attached to the decorative layer 12 using a suitable adhesive 26 which may be permanent or releasable. Examples of such adhesives include the following. Suitable aqueous latex adhesives include, for example, styrene-butadiene copolymers, ethylene/vinyl acetate copolymers, polyacrylates and blends thereof. Non-aqueous latex adhesives may also be used. Suitable thermoplastic adhesives include, for example, polyvinyl chlorides, polyurethanes, polyolefins, ethylene/vinyl ester copolymers, ethylene/alkyl (meth) acrylate copolymers, and ethylene/olefin copolymers. Suitable hot-melt adhesives include, for example, adhesives comprising a thermoplastic resin, tackifying resins, waxes, and plasticizers.

The thermoplastic and hot-melt adhesives in the form of films may be used. The stabilizing layer may be coated with the adhesive in any manner such as by spraying, dipping, kiss-roll coating, or by lamination. In other embodiments, the stabilizing layer may be attached to the underside of the decorative fabric by a pressure sensitive adhesive, mechanical means such as by a Velcro® hook and loop fastening system or by ultrasonic bonding.

Alternatively, the adhesive properties of the plastic matrix 16 itself may be used to adhere the stabilizing layer to the decorative layer. The material of the stabilizing layer may be adhered to the lower surface of the opaque portion 16D (if provided) of the plastic matrix 16. If no opaque portion 16D is provided, the stabilizing layer may be adhered to the lower surface of the transparent portion 16T of the plastic matrix 16. No separate adhesive layer is required in such a case.

As illustrated in FIG. 2, in instances wherein the fabric base 14 is adhered beneath the decorative layer, the stabilizing layer 24 is attached beneath the fabric base 14 using the adhesive 26. However, it should be understood that in cases as shown in FIG. 2 it may be desirable to eliminate a separate stabilizing layer 24. In this event the fabric base 14 is selected from a material that has sufficient elongation, strength, dimensional stability and puncture resistance so as to function as a stabilizing layer.

The stabilizing layer is typically a scrim or sheet material comprising a fibrous non-woven material or thermoplastic compound. The scrim may comprise an open network of intersecting strands such as, for example, fiberglass, polyolefin, polyamide, cotton, jute, acrylic and polyester strands. Fiberglass strands are particularly effective, because of their good tensile strength and "moisture stability." By the term, "moisture stability", it is meant that the length of the strands are substantially unchanged due changes in the temperature and humidity. For purposes of this invention, the thickness of the scrim should generally be in the range of about three (3) to about two-hundred-fifty (250) mils.

Typically, the amount of strands running in the "machine direction" (length direction), i. e., the direction in which the scrim is being produced by the machine and the amount of strands running in the "cross direction" (width direction), i. e., the direction perpendicular to the direction in which the scrim is being produced by the machine are equal. The strands should also be equally spaced apart in the length direction and width direction.

Fibrous non-woven sheets are described above and include spun-bonded fabrics such as those sold under the registered trademarks Tyvek®, Typar®, and Reemay® and spun-laced fabrics such as that sold under the registered trademark Sontara®. Thermoplastic compounds can also be used to make sheet materials having good stabilizing properties. A scrim of glass coated polyester strands is particularly suitable.

In addition to scrims and sheet materials, other materials may be used as the stabilizing layer. For example, velours, felts, woven, knitted, flocked, needle-punched and fusion-bonded fabrics may be used along with poly(vinyl chloride) resins, paper felts, reinforced paper, foamed urethane, and composite structures such as PVC vinyl flooring. These materials may be used independently or in combination with each other. For instance, the stabilizing layer may comprise a non-woven sheet adhered to a scrim. A brushed knitted fabric having loopy surface can also be used as a stabilizing layer. It is also recognized that these materials may be used in combination with each other. The type of material used for the stabilizing layer will vary depending on the desired properties of the composite floor covering. For instance, certain materials may be more effective in providing resistance against indentation marks from heavy furniture and appliances. Other materials may be more effective in providing puncture resistance or may provide better fabrication.

CUSHIONING LAYER

The composite floor covering may further include a cushioning 28 provided, as an option, for cushioning and support. The cushioning layer 28 is disposed beneath the stabilizing layer 24 (if provided). If a stabilizing layer is not provided, as in the instance in which the fabric base 14 functions as a stabilizing layer, the cushioning layer 28 is attached to the undersurface of the fabric base 14. The cushioning layer 28 comprises fiber felts or a foamed composition selected from the group consisting of rubber, latex, urethane, and poly(vinyl chloride).

Preferably, the lower surface of the stabilizing layer is attached to the cushioning layer by such permanent or releasable adhesive means as described above, but this is not necessary. In some instances, it may be desirable to have the stabilizing layer simply lay on the cushioning layer. As will be discussed herein, the alternate embodiment of the invention comprehends this possibility.

The cushioning layer may comprise any suitable material such as for example, foamed compositions of rubber, latex, hot-melt resins, urethane, poly(vinyl chloride) resins. These compositions may be combined with fabrics such as velours, felts, wovens, non-wovens, knitted, flocked, needle-punched, and fusion-bonded to provide a good cushioning layer. Fibers used for the cushioning layer are polyamide, polyester, polyolefin, jute, acrylic or cotton. Carpets such as unitary carpets and particularly tufted carpets having a tufted primary backing laminated to a secondary backing may also be used.

The thickness of the cushioning layer is at least one-tenth (0.1) inches and is preferably in the range of about 0.125 inches to about 0.625 inches. Preferably, the density of the cushioning layer is greater than three (3) lbs/ft$^3$. The thickness and density of the cushioning layer are significant, because these properties help provide the desired resilience and cushioning effect to the entire floor covering.

If a carpet having a tufted primary and secondary backing is used as the cushioning layer, it is preferable that the secondary backing be attached to the lower surface of the stabilizing layer and that the projecting tufts be in contact with the floor. However, in some instances, it may be desirable to attach the projecting tufts from the primary backing to the lower surface of the stabilizing layer. This may be done by spraying the tufts and decorative fabric with an adhesive.

WEAR LAYER

If desired, a transparent flexible wear layer 32 may be disposed over the plastic matrix of the decorative layer. Preferably, the transparent wear layer may be implemented using urethane, poly(vinyl chloride), silicone or fluoropolymer.

MANUFACTURE

The fibrous structures 18 may be incorporated into the plastic matrix 16 by a number of different methods. In one instance the fibrous structures 18 are mixed into the liquid plastisol. This mixture is then applied to the fabric base 14. This composite is then placed in an oven and the plastisol is solidified.

An alternate method may be used in which the plastisol containing the fibrous structures is solidified first, and the resulting solid, clear plastic is cut into pieces. These pieces are then distributed randomly over a base opaque PVC layer and supported underneath with a stabilizing fabric base. When the fabric base is a decorative fabric, the plastic matrix containing the fibrous material in the form of pellets or small pieces are distributed directly over the decorative fabric, so that the fabric base design shows through. The product is then compressed under conditions in which the plastic matrix will melt, but the fibrous structures will not.

A third method includes feeding the solid plastic matrix material and the fibrous structures into an extruder. The extruder is operated at conditions at which the plastic matrix material melts but the fibrous structures do not. In all cases minimal shear is applied to the mixture so that the fibrous structures remain as discrete pieces, visible within the plastic matrix.

The fabric base 14 may be embedded within the plastic matrix 16, as is illustrated for the composite floor covering 10 of FIG. 1. This arrangement is realized by placing the fabric base 14 above and below a suitable layer of plastic matrix material prior to solidification of the plastic matrix.

Alternatively, as is shown in the composite floor covering 10' of FIG. 2, the fabric base 14 may define the lower surface of the plastic matrix 16. This arrangement may be achieved by layering plastic matrix material over the fabric base 14 prior to solidification of the plastic matrix 16. The adhesive properties of the matrix serves to hold the base 14 in place. Alternatively, the base 14 may be secured to the lower surface of the matrix 16 after is has been formed using a a suitable adhesive 26.

Although the product of the present invention is primarily used for a floorcovering, other uses should be apparent. For example, the present invention may be used for tile, as a baseboard material, or as countertop material.

The present invention is further illustrated by the following examples, but these examples should not be considered as limiting the scope of the invention.

EXAMPLE 1

A plastisol is prepared with the following composition:

|  | Parts by Weight |
| --- | --- |
| Poly(vinyl chloride) | 100 |
| NUOPLAS 6000 (a) | 50 |
| Mark 4737 (b) | 3 |
| Epoxidized soybean oil | 5 |

(a) NUOPLAS 6000 is a polyester plasticizer sold by Huls America, Inc.
(b) Mark 4737 is a barium and zinc stabilizer sold by Witco Corporation.

Ninety-five percent (95%) by weight of this plastisol and five percent (5%) by weight of nylon 6,6 yarns with different colors are mixed to distribute the yarns throughout the plastisol composition. Mixing of the plastisol and yarns is done at low shear to minimize damage to the yarns. The nylon yarns consist of pink eighteen denier per filament (18 dpf) yarns cut to nine (9) mm lengths and seven (7) with range of seventeen to twenty-three denier per filament (17 to 23 dpf) yarns each with different colors—light green, charcoal, pink, tan, blue, purple and white—with cut lengths between nine and twenty-five millimeters (9 and 25 mm.). Total denier of the yarns is between 1100 and 1750.

The PVC plastisol/yarn mixture is spread upon a Teflon® film and heated in an oven at 320° F. for five (5) minutes to solidify the plastisol. The yarns and separated filaments are easily seen in the clear, flexible PVC matrix.

The PVC matrix is stripped from the Teflon® film and cut into pieces approximately twenty-five millimeters square (25 mm×25 mm) in size. These pieces are distributed randomly on a solid, opaque, filled poly(vinyl chloride) composition to cover about fifty percent (50%) of the surface area of the decorative layer. This decorative layer comprising a plastic matrix having discrete fibrous structures embedded therein was placed over a 3.3 oz./yd$^2$, PVC-coated polyester open mesh backing which acts as a fabric base and as a stabilizing layer. The composite structure was then compressed at approximately one thousand pounds per square inch (1000 psi) for five (5) minutes at 350° F. This causes the matrix to fuse together in which the fabric base/stabilizing layer gets embedded into the matrix. The fabric base/stabilizing layer remains intact. The fibrous structures in the form of yarn and randomly disposed group of its individual filaments also stays intact and are easily seen in the clear layer contrasted against the opaque PVC base layer. The composite structure was used as a floorcovering and was placed over a one-quarter inch thick, eighteen pounds per cubic foot density (18 lbs/ft$^3$) rubber cushion.

EXAMPLE 2

The process of Example 1 is repeated except that the yarns are replaced by five percent (5%) weight of the cut fragments of fabric. Approximately half of the fabric fragments are four colors of cotton/rayon apparel fabric in which the yarns are approximately seventy (70) denier. The colors are orange, beige, green, and blue. The remainder of the fabric fragments are green/black, nylon/Lycra® spandex apparel fabrics in which the yarns are approximately seventy (70) denier. These cut fragments of fabric are in different shapes and sizes up to maximum of about one-and-one-half (1.5) inch in any direction. The resulting fragments are mixed with the PVC plastisol of Example 1 and processed as in Example 1. In the final product the stabilizing layer/fabric base stays substantially intact and the fabric fragments are visible against the opaque PVC layer. A bottom cushioning layer of one-quarter inch thick, eighteen pounds per cubic foot density (18 lbs/ft$^3$) rubber cushion was used to construct a composite floor covering.

EXAMPLE 3

In this Example, 2.5% by weight of the fibrous material are the yarns of Example 1 and 2.5% by weight are the fabric fragments of Example 2 for a total of 5% by weight of fibrous material. These are mixed with the clear PVC plastisol at low shear. The final product has a combination of the features of Examples 1 and 2.

EXAMPLE 4

In this Example, a dyed, 10.7 oz/yd$^2$, polyester/cotton, woven textured fabric (decorative fabric) was used as a stabilizing layer in place of a PVC-coated polyester backing. The PVC plastisol/fibrous structure compound as prepared in Example 3 is spread upon a Teflon® film and heated in an oven at 320° F. for five (5) minutes to solidify the plastisol.

The fibrous structures are easily seen in the clear, flexible PVC matrix. This decorative PVC matrix is stripped from the Teflon® film and cut into pieces approximately ten millimeters square (10 mm×10 mm) in size. These pieces are distributed randomly over the decorative, textured fabric base to cover about five percent (5%) of the surface area of the decorative layer.

The composite structure was then compressed at approximately one thousand pounds per square inch (1000 psi) for five (5) minutes at 350° F. This causes the matrix to fuse together. The composite product is thus formed with a top layer of a decorative plastic matrix layer which contains the fibrous structures supported underneath with a decorative fabric base which stays intact. The product displays the base fabric design with clear PVC layer on the facing of the fabric in which the discrete fibrous structures are also seen. Since the yarn components of the decorative woven fabric base had the melt temperature higher than 350° F., the final product had an interesting three-dimensional effect with the decorative fabric showing through the discrete fibrous structures. The composite structure was used as a floorcovering and was placed over a one-quarter inch thick, eighteen pounds per cubic foot density (18 lbs/ft$^3$) rubber cushion.

EXAMPLE 5

A compound with the following composition was prepared:

|  | Parts by Weight |
| --- | --- |
| Poly(vinyl chloride) | 100 |
| Ethylene/ester/carbon monoxide terpolymer | 100 |
| Mark 4737 (b) | 5 |
| Epoxidized soybean oil | 8 |
| Di-Lauryl Thiodipropionate | 1.5 |
| Irganox 1010 (c) | 0.5 |
| Calcium carbonate | 5 |

(c) Manufactured by Ciba-Geigy Corporation

Ninety-five percent (95%) by weight of this composition and five percent (5%) by weight of the yarns of Example 1 are mixed and fed to a one-and-one-half inch (1.5 in) single screw extruder with the screen pack and breaker plate removed to minimize shear. The cylindrical extrudate is converted to pellets approximately nine to thirteen millimeters (9 to 13 mm) in diameter and approximately nine millimeters (9 mm) in length.

The pellets are distributed randomly on the surface of a solid, opaque, filled poly(vinyl chloride) composition to cover about fifty percent (50%) of the surface area. This decorative layer comprising a plastic matrix having discrete fibrous structures embedded therein was placed over a 3.3 oz./yd$^2$, PVC-coated polyester open mesh backing which acts as a fabric base and as a stabilizing layer. The composite structure was then placed in a press at one thousand pounds per square inch (1000 psi) for five (5) minutes at 350° F. This causes the matrix to fuse together in which the fabric base/stabilizing layer stays intact. The fibrous structures which are embedded in the clear plastic matrix are visible against the opaque PVC layer giving the visual appearance similar to the product as described in Example 1. The final composite floorcovering was prepared with the above-described product having a bottom cushioning layer of a one-quarter inch thick, eighteen pounds per cubic foot density (18 lbs/ft$^3$) rubber cushion.

EXAMPLE 6

The process of Example 5 is repeated with five (5%) by weight of the cut fabrics of Example 2 replacing the yarns of Example 5. The final product resembles the appearance of the Example 2.

EXAMPLE 7

The process of Example 5 is repeated except that the 2.5% by weight of the fibrous material are the yarns of Example 1 and 2.5% by weight are the fabric fragments of Example 2 for a total of 5% by weight of fibrous material. The final product is comparable to the product of Example 3.

EXAMPLE 8

In this Example, the decorative woven fabric of Example 4 is used in place of a PVC-coated polyester backing as a stabilizing layer. The fibrous material consisted of 2.5% by weight of colored yarns as in Example 1 and 2.5% by weight of colored fabric fragments of Example 2. A clear plastic matrix containing these fibrous materials in the form of pellets were prepared as the above Example 5 and sprinkled randomly over the decorative textured fabric base to cover about five percent (5%) of its surface area.

The composite structure was then compressed at approximately one thousand pounds per square inch (1000 psi) for five (5) minutes at 350° F. The final product characteristics had similar three-dimensional features as described in Example 4.

EXAMPLE 9

In this case, the sample was prepared as in Example 1, except that the stabilizing layer was a brushed knit nylon fabric weighing about 2.2 oz./yd$^2$. The lower surface of the stabilizing layer was in the form of a loop-covered surface. The stabilizing fabric base was not embedded in the plastic matrix as in Example 1, but rather it was underneath the decorative top layer which consisted of clear plastic matrix having fibrous material over an opaque PVC layer. The hook portion of a Velcro®-type mechanical fastener was adhered to the floor and in the other case on to a one-quarter inch (¼") thick rubber cushion having a density of eighteen pounds per cubic foot (18 lbs/ft$^3$). The floor covering product was then assembled by simply pressing the loop covered lower surface of the stabilizing layer on to the hook portion of the upper surface of the floor or the cushioning layer.

The upper decorative top layer with the stabilizing layer was able to be detached (as for repair, or replacement, etc.) and re-attached for further use.

EXAMPLE 10

In this case, the sample was prepared as in Example 9, except that the top decorative layer had a thin layer of protective polyurethane coating on its surface.

What is claimed is:

1. A composite floor covering comprising a decorative layer itself comprising a fabric base and a transparent plastic matrix, the plastic matrix having discrete fibrous structures embedded therein, the plastic matrix having predetermined melting and rheological characteristics associated therewith such that the fabric base and the fibrous structures remain substantially intact while the plastic matrix solidifies.

2. The composite floor covering of claim 1 wherein the fabric base is selected from the group consisting of velours, felts, woven, non-woven, knitted, flocked, needle-punched, tufted and fusion-bonded fabrics.

3. The composite floor covering of claim 1 wherein the plastic matrix lies over the fabric base.

4. The composite floor covering of claim 3 wherein the fabric base has sufficient dimensional stability and puncture resistance so as to function as a stabilizing layer disposed beneath the decorative layer.

5. The composite floor covering of claim 3 further comprising a cushioning layer disposed beneath the fabric base, wherein the cushioning layer comprises a foamed composition selected from the group consisting of rubber, latex, urethane, and poly(vinyl chloride).

6. The composite floor covering of claim 1 further comprising a transparent wear layer disposed over the decorative layer, wherein the transparent wear layer comprises a material selected from the group consisting of flexible poly(vinyl chloride), polyurethane, silicone, and fluoropolymer.

7. The composite floor covering of claim 1 wherein the fabric base is embedded within the plastic matrix.

8. The composite floor covering of claim 7 further comprising at least one stabilizing layer disposed beneath the decorative layer.

9. The composite floor covering of claim 1 wherein the fibrous structure comprises groupings of multi-oriented individual fibers, wherein the length of the individual fibers is greater than about nine (9) millimeters.

10. The composite floor covering of claim 9 wherein the individual fibers are crimped and crinkled, and wherein the individual fibers are selected from the group consisting of polyester, polypropylene, cotton, silk, wool, acrylic and nylon.

11. The composite floor covering of claim 9 wherein the fibers occupy up to about eighty-five percent (85%) of the surface area of the decorative layer.

12. The composite floor covering of claim 9 wherein the fabric base is a decorative fabric.

13. The composite floor covering of claim 12 wherein the fibrous structures comprise individual fibers that occupy from about five percent (5%) to about fifty percent (50%) of the surface area of the decorative layer.

14. The composite floor covering of claim 1 wherein the fibrous structure comprises fabric fragments.

15. The composite floor covering of claim 14 wherein the fabric fragments have no dimension greater than about one-and-one-half (1.5) inch.

16. The composite floor covering of claim 14 wherein the fabric fragments are selected from the group consisting of velours, felts, woven, non-woven, knitted, flocked, needle-punched, tufted and fusion-bonded fabrics.

17. The composite floor covering of claim 14 wherein the fabric fragments occupy up to about eighty-five percent (85%) of the surface area of the decorative layer.

18. The composite floor covering of claim 14 wherein the fabric base is a decorative fabric.

19. The composite floor covering of claim 18 wherein the fibrous structure comprises fabric fragments that occupy from about five percent (5%) to about fifty percent (50%) of the surface area of the decorative layer.

20. The composite floor covering of claim 1 wherein the plastic matrix includes a transparent portion and an opaque portion, wherein the opaque portion lies beneath the transparent portion, and wherein the fibrous structures are disposed in at least the transparent portion.

* * * * *